INVENTOR.
ARIE J. C. BAKHUIZEN

United States Patent Office 3,426,225
Patented Feb. 4, 1969

3,426,225
SYNCHRONOUS STEP MOTOR INCLUDING MEANS FOR PRODUCING ASYNCHRONOUS OPERATION
Arie Johannes Cornelis Bakhuizen, Mierlo, Netherlands, assignor to North American Philips Company, Inc., New York, N.Y., a corporation of Delaware
Filed Jan. 7, 1966, Ser. No. 519,333
Claims priority, application Netherlands, Jan. 13, 1965, 6500348; Nov. 24, 1965, 6515206
U.S. Cl. 310—49                                18 Claims
Int. Cl. H02k 37/00

ABSTRACT OF THE DISCLOSURE

A synchronous step motor comprising a rotor having a plurality of teeth composed of magnetic material and a stator having a plurality of stator poles each of which includes a plurality of teeth. The stator windings are selectively energized in a given sequence of pole groups. The motor also includes means for producing asynchronous operation thereof comprising short-circuited winding means on the rotor and means for energizing the stator windings with out of phase currents so that the asynchronous motor speed is determined by the number of stator poles and the mode of energization thereof.

---

This invention relates to synchronous step motors and more particularly to a step motor including means for producing a high speed asynchronous mode of operation thereof. The step motor is of the type comprising groups of stator poles and a rotor provided with teeth composed of a soft magnetic material such as soft iron. The rotor teeth cooperate with the stator poles which are subdivided to define a pluraltiy of stator teeth for each stator pole. The angle between two stator teeth is equal to the angle α between successive rotor teeth and the angle between two adjacent stator poles is $(a+b/n)\alpha$, wherein $a$ is a positive integer, $n$ the number of stator pole groups and $b$ the difference in the ordinal numbers of the sequential energizations of the stator poles.

Throughout the specification and claims, the term "stator pole groups" is to be understood to mean those stator poles which are energized at the same instant of time and for the same time interval.

Step motors may be used for numerical control because they are capable of performing a very great number of steps per revolution, for example, $n$-times the number of rotor teeth. However, it is often desirable to be able to quickly drive the controlled equipment from a remote position up into close proximity to a given position. The equipment is then slowly stepped into the exact position desired. However, known step motors are not capable of performing the necessary accelerated movement to achieve coarse positioning rapidly so that a separate high-speed motor is required for the high speed drive of the controlled equipment.

It is therefore an object of the invention to provide a synchronous step motor including means for producing high speed asynchronous operation.

It is another object of the invention to provide a synchronous step motor which can be operated asynchronously with a uniform torque.

A further object of the invention is to provide a motor which can operate in a high speed asynchronous mode to provide coarse positioning control and also can operate in a synchronous stepping mode to provide fine positioning control.

A still further object of the invention is to provide a new and improved rotor structure for a step motor.

According to the invention, in order to achieve high speed coarse positioning, the motor is provided with a rotor having a winding for producing asynchronous operation of the motor. The asynchronous speed of the motor is determined by the number of stator poles and the mode of energization thereof. By energizing the stator poles so that the reluctance between the cooperative north and south poles does not vary substantially, an asynchronous speed is obtained which depends only upon the number of operative stator pole pairs, and does not depend on the number of teeth in each stator pole. As a result, the motor operates at a much higher speed than it is capable of as a step motor. The high speed drive motor thus may be omitted so that, in addition, the overall mass to be accelerated by the step motor, inclusive of the rotor mass of the separate motor, is much smaller and hence the stepping rate may be higher.

In several embodiments of the rotor according to the invention, the winding for producing asynchronous operation is in the form of a squirrel cage. In one particular embodiment of the motor, the squirrel cage rotor is obtained by at least partly filling in the interstices between the rotor teeth with nonmagnetic material of high electrical conductivity. The current paths in the non-magnetic material on either side of the magnetic field are then closed by relatively insulated rings of the same material. Each of said rings is provided with a number of lugs distributed as uniformly as possible along the ring circumference by means of which the rings engage the rotor. The rings are mounted so that the lugs of the various rings are staggered about the rotor over at least one tooth each.

This construction is especially attractive in the case where the step motor is provided with teeth having laminations which extend in an axial direction. If, in addition, the stator field is axially oriented, the rotor then may be made of a copper disc in which the soft magnetic tooth laminations are fastened in radial slots which are provided in the periphery of the disc and extend in an axial direction. Flat copper rings are provided having a number of radial inwardly extending lugs distributed as uniformly as possible about the ring circumference. The dimension of the lugs in the circumferential direction is smaller than, or equal to, the distance between two rotor teeth so that the rings are secured to the copper disc by means of a press fit. The rings are insulated from one another, preferably by means of spacer rings composed of an insulating material. The copper rings are arranged about the rotor so that the lugs of the different rings are offset relative to one another over one or more rotor teeth. This relative displacement of the ring lugs insures that in any position of the rotor the asynchronous torque is practically uniform.

A further feature of the invention is that the distance between the lugs of a ring may be chosen so that at least a major part of the torque of fields other than the field of the fundamental wave is suppressed.

Other advantages and features of the invention will become apparent from the following description of the invention taken in conjunction with the accompanying drawing in which.

Figure 1:
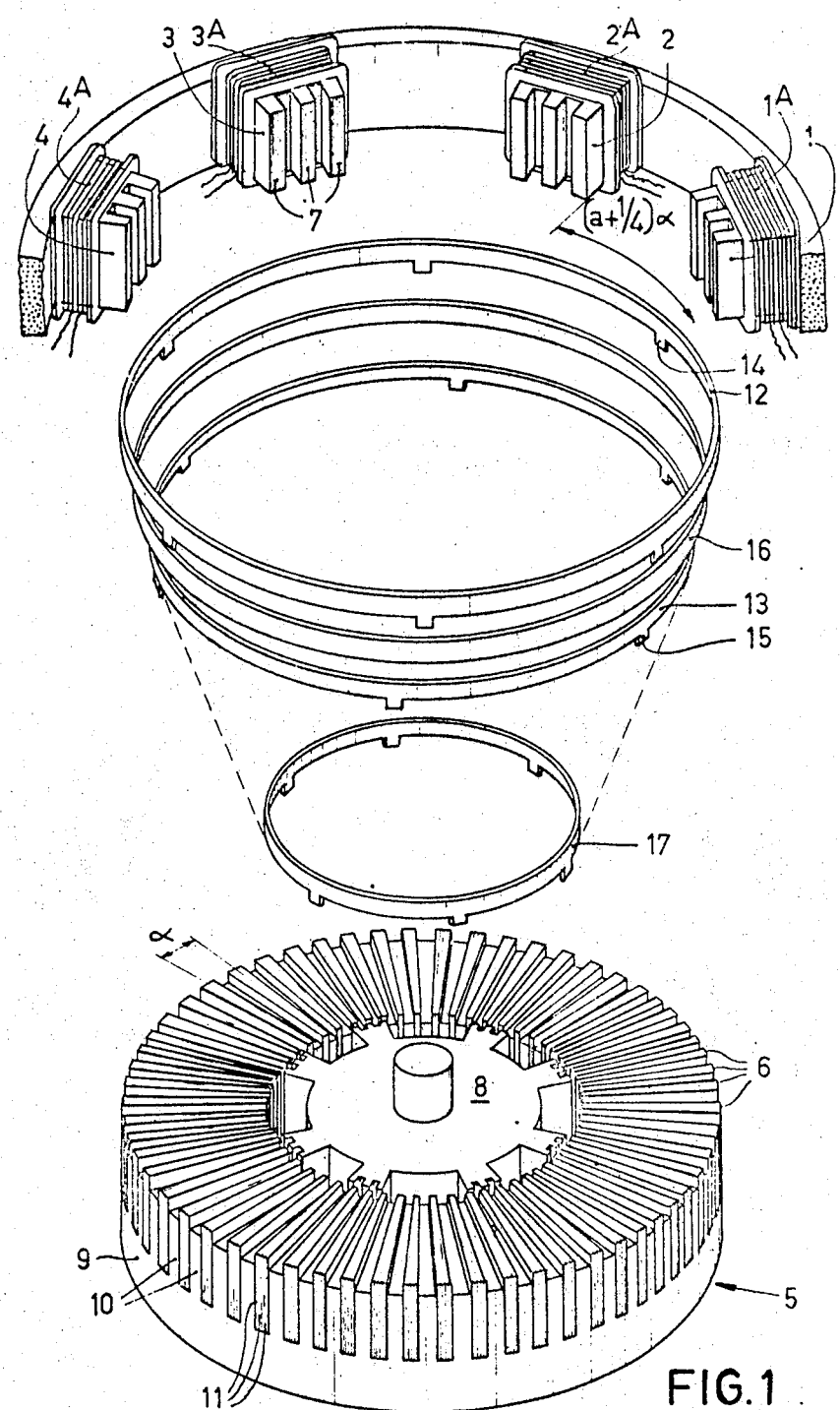
FIGURE 1 illustrates a motor according to the invention in which the field is oriented radially and the short-circuit rings are arranged on one end face of the rotor.

Referring first to FIGURE 1, a stator composed of a plurality of stator poles 1, 2, 3 and 4 is arranged around a rotor 5. The rotor is provided with teeth 6 composed of soft magnetic material which cooperate with the stator poles 1, 2, 3 and 4. Each stator pole is provided with a plurality of stator teeth 7 so that the angle subtended between two adjacent teeth 7 is equal to the angle $\alpha$ subtended between two adjacent rotor teeth 6. The angle between two successive stator poles is equal to $(a+b/n)\alpha$, wherein $a$ is a positive integer, $n$ is the number of groups of stator poles and $b$ is the difference between the ordinal numbers in the sequential energizations of the two stator poles. In this embodiment the stator has eight poles arranged so that every two diametrically opposite poles are associated with one another. If two adjacent stator poles 1 and 2 are energized in order of succession, then $b=1$ and $n=4$, so that the overall displacement amounts to $(a+1/4)\alpha$.

Figure 5:
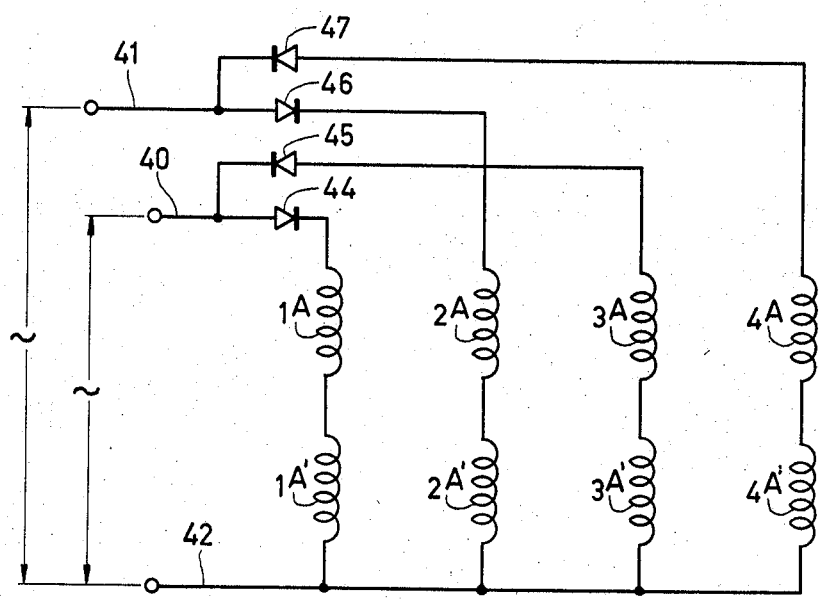
FIGURE 5 shows how the stator windings of the motor of FIGURE 1 can be energized to provide the asynchronous mode of operation.

The rotor 5 consists of a copper disc 9 having a cavity for accommodating an inner stator disc 8. The stator disc 8 is located opposite the inside edge of the rotor teeth 6 and is provided with confronting poles. Each of said poles has a plurality of teeth in a manner similar to the outer stator rings, and is energized by coils 1a, 1a′, 2a, 2a′, etc. As shown in FIGURE 5, the stator windings of FIGURE 1 can be energized to provide the asynchronous mode of operation. The supply lines 40 and 41, and the common line 42, interconnect a two phase supply system, not shown, that supplies voltages that are 90° out of phase, with the stator coils 1a, 1a′, 3a, 3a′ and 2a, 2a′, 4a, 4a′, respectively, via the diodes 44, 45 and 46, 47 respectively so that the coils 1a and 1a′ are energized during the first positive half cycle of the voltage of the supply line 40. The voltage of the supply line 41 lags 90° in phase and, as soon as the fields in the coils 1a and 1a′ reach their maximum amplitude, the coils 2a and 2a′ are energized. Then, during the negative half cycle of supply line 40 the coils 3a and 3a′ are energized. Finally, the coils 4a and 4a′ are energized during the negative half cycle of supply line 41.

Radial slots are provided in the rotor into which teeth 6 fit extending in an axial direction. Each rotor tooth 6 consists of axial tooth laminations 11. On the exposed surface of the rotor containing teeth 6, short circuit rings 12, 13 . . . 17 made of copper are provided concentric to the rotor axis. These rings have axial lugs 14, 15, etc., which are uniformly distributed along the circumference thereof. The rings are electrically connected to the copper disc 9 by inserting the lugs between adjacent pairs of teeth 6 so as to contact the conductive portions 10 of the rotor. The rings 12, 13 . . . 17 are of different diameters and are concentrically arranged one inside the other. The rings 12 and 13 are insulated from one another by a thin ring 16 of insulating material, as are the further rings (not shown). The lugs of rings 12, 13, etc., are offset relative to one another over a distance of one rotor tooth so that the teeth of the innermost short circuit ring 17 are located along side of the teeth of the outermost ring 12. By means of the aforesaid displacement of the lugs, the asynchronous torque of the rotor is substantially the same in any position of the rotor. Moreover, the distance between the lugs of the same ring may be chosen so that the major part of the torque of fields other than the field of the fundamental wave is suppressed. Owing to the substantially rectangular shape of the poles 1, 2, 3, 4, etc., the air gap between the teeth 6 and 7 being virtually constant in the rotating field of the rotating field of the fundamental wave, the 5th, 9th, etc. As the amplitudes of these harmonics are substantially inversely proportional to the order of the harmonic, it will be clear that the influence of the 3rd harmonic is the most severe. By choosing the pitch of the connected rods of the squirrel cage so that the flux traversing the individual circuits is constant for these harmonics, the undesired induction voltages, and the currents resulting therefrom, are eliminated. For example, the 3rd harmonic is suppressed by making the pitch of the connected rods equal to 2/3 of the pole-pitch of the fundamental field. Therefore in the case of a four-pole motor we have $$2/3 \cdot \frac{2\pi r}{4} = 1/3\pi r$$

In this case there are six lugs 14 or rods 32 (FIG. 4) along the circumference.

In this manner, those harmonic torques which periodically counteract the torque of the fundamental wave, for example, the third harmonic torque, are substantially eliminated so that a more uniform operation with higher torque is obtained.

It will be obvious that where reference is made hereinbefore to rings with lugs, these rings may be replaced without the need for further means by simple wire-shaped through-connections.

Figure 2:
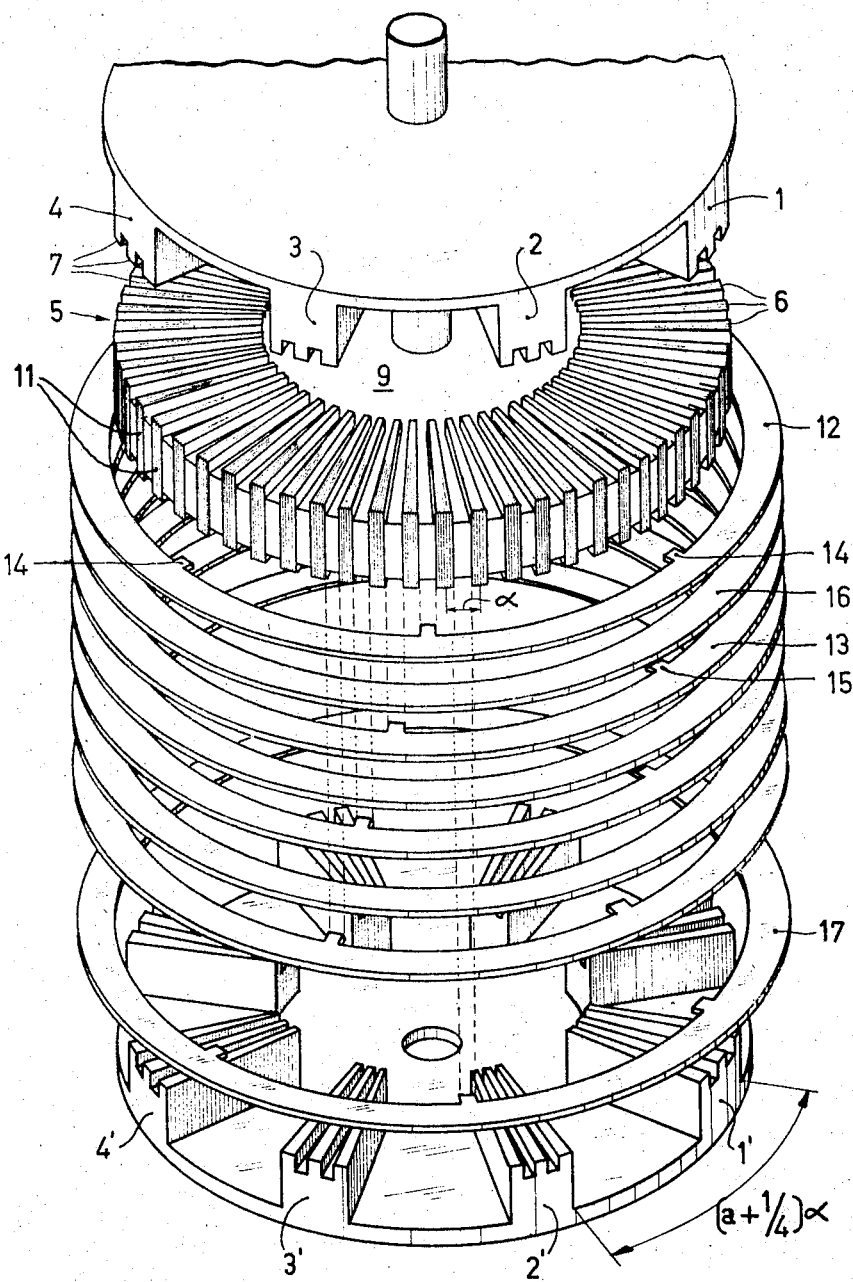
FIGURE 2 illustrates another embodiment of the motor in which the field is oriented axially and the short-circuit rings are arranged around the rotor teeth.

Referring now to FIGURE 2, the stator poles 1, 2, 3, 4 and 1′, 2′, 3′, and 4′, are arranged axially on either side of the rotor 5. The rotor consists of a copper disc 9 in which tooth laminations 11 composed of soft magnetic material are fastened in radial slots provided about the circumference of the disc 9 and extending axially through the disc. The laminations 11 constitute the rotor teeth 6 which cooperate with the stator poles 1, 1′, 2, 2′, 3, 3′, and 4, 4′. Each stator pole is provided with a plurality of stator teeth 7 arranged so that the angle between two stator teeth is equal to the angle $\alpha$ between two adjacent rotor teeth. As in FIG. 1, the angle between two successive stator poles is aqual to $(a+b/n)\alpha$, wherein $a$ is a positive integer, $n$ is the number of stator pole groups and $b$ is the difference between the ordinal numbers in the sequential energizations of the two stator poles. The stator of FIGURE 2 has sixteen poles and each pair of opposite poles 1, 1′, 2, 2′, 3, 3′, and 4, 4′ form one pole pair. At the same time, diametrically opposite poles are associated with one group of stator poles. If two adjacent stator pole pairs 1, 1′ and 2, 2′ are energized in order of succession, $b=1$ and $n=4$, so that the overall displacement of the two stator poles is $(a+1/4)\alpha$. Flat copper rings 12, 13, etc., are provided with a number of radial inwardly projecting lugs 14, 15, which are distributed uniformly about the inside circumference thereof. The width of the lugs is equal to or smaller than the space between two rotor teeth 6 so that the rings may be fastened to the copper disc 9 as a pressure fit. The rings 12, 13 are insulated from each other by positioning discs 16 composed of insulating material therebetween. The rings 12, 13, etc., are mounted so that the lugs 14, 15, etc., are progressively shifted about the rotor over one or more rotor teeth 6 until the lugs of the last ring 17 are again located along side of the lugs of the first ring 12. In this case too, the staggered relationship of the lugs 14, 15 of the rings 12, 13 . . . 17 insures that the asynchronous driving torque is substantially the same in any position of the rotor. In addition, the distance between the lugs of a given ring is chosen so as to suppress the major part of the torque of fields other than the field of the fundamental wave.

The magnetic circuit is designed so that the reluctance, as a function of the angle of rotation of the rotor, is substantially constant during asynchronous operation of the motor. This can be achieved, for example, by a simultaneous energization of the poles 1, 1′ and 3, 3′, and also of the poles 2, 2′ and 4, 4′ in a manner such that the field of the poles 2, 2′, 4, 4′ is in quadrature with the field of the poles 1, 1′, 3, 3′. The motor then operates as a four pole asynchronous machine.

A motor of the type shown in FIG. 2, in which the field between the poles of a pair of poles is oriented axially, provides the advantage that the rotor can be built up of flat, relatively insulated discs composed of a non-magnetic material of high electrical conductivity. Each disc may then comprise a circular inner disc connected with an outer concentric ring by means of ring lugs elongated into the form of interconnecting spokes. In this case, both the inner circular circumference of the outer ring and the outer circumference of the inner disc may be provided with opposed radial lugs. The spacing between these lugs in the circumferential direction is substantially equal to the thickness of one rotor tooth. It is thus possible to form the rotor by punching slots in the discs so that the time consuming milling of slots is no longer required.

Figure 3:
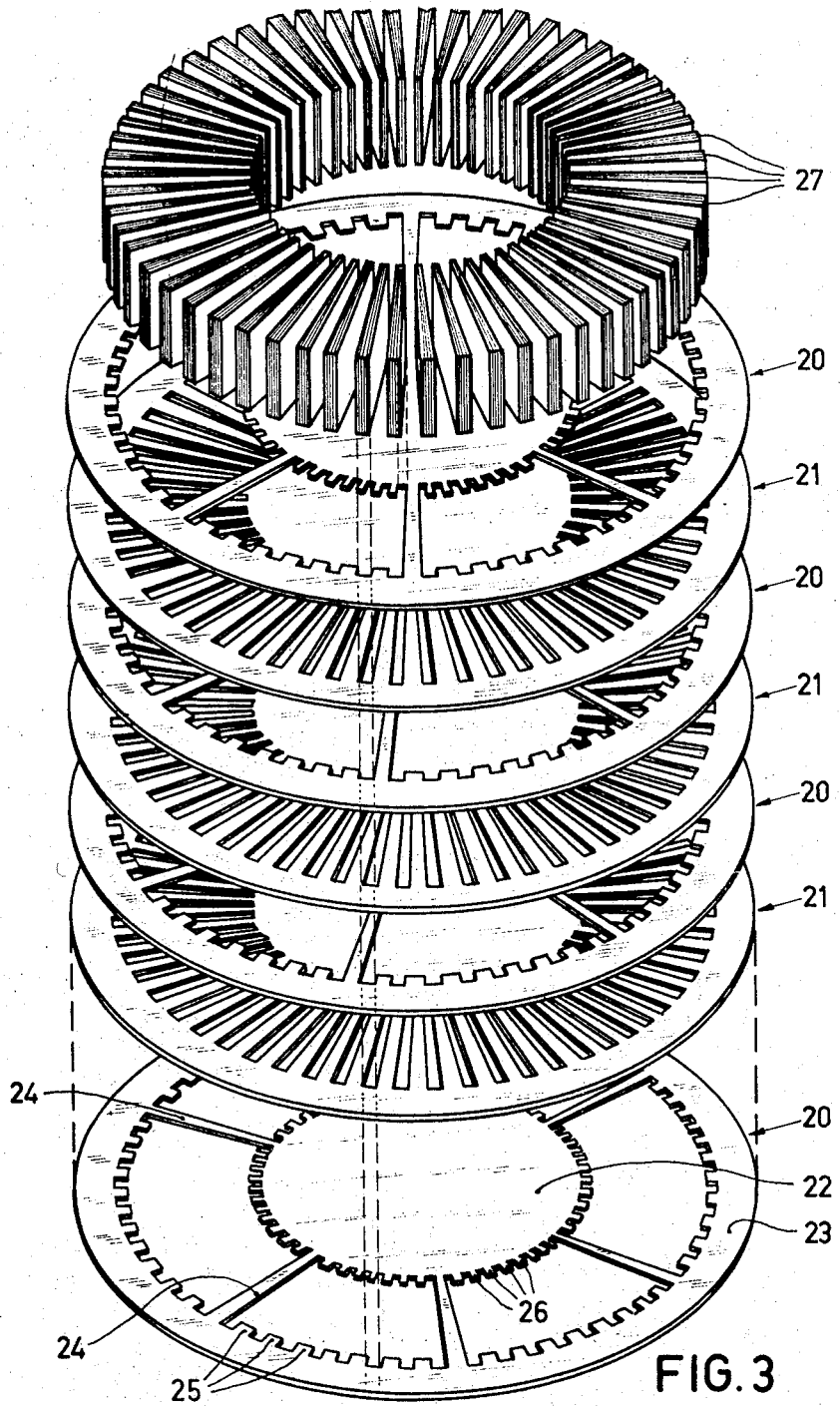
FIGURE 3 shows a rotor composed of flat discs which may be substituted for the rotor of FIGURE 2.

FIGURE 3 shows the details of this rotor structure which is otherwise similar to the motor of FIGURE 2. The rotor consists of flat, non-magnetic discs 20 of a material having a high electrical conductivity. The discs 20 are insulated from one another by means of radially slotted rings 21 composed of insulating material. Each disc 20 comprises a circular inner disc 22 connected to an outer concentric ring 23 by means of spokes 24. Both the inner circumference of the outer ring 23 and the outer circumference of the inner disc 22 are provided with lugs 25, 26, respectively. The spokes 24 of each rotor disc are progressively shifted over a distance equal to at least one rotor tooth 27. The slots in the disc 21 and the lugs 25, 26 in the discs 20 are aligned so that the rotor teeth 27 may be mounted in the resultant axial channels thus formed. The rotor teeth may consist of soft iron laminations, as before.

Figure 4:
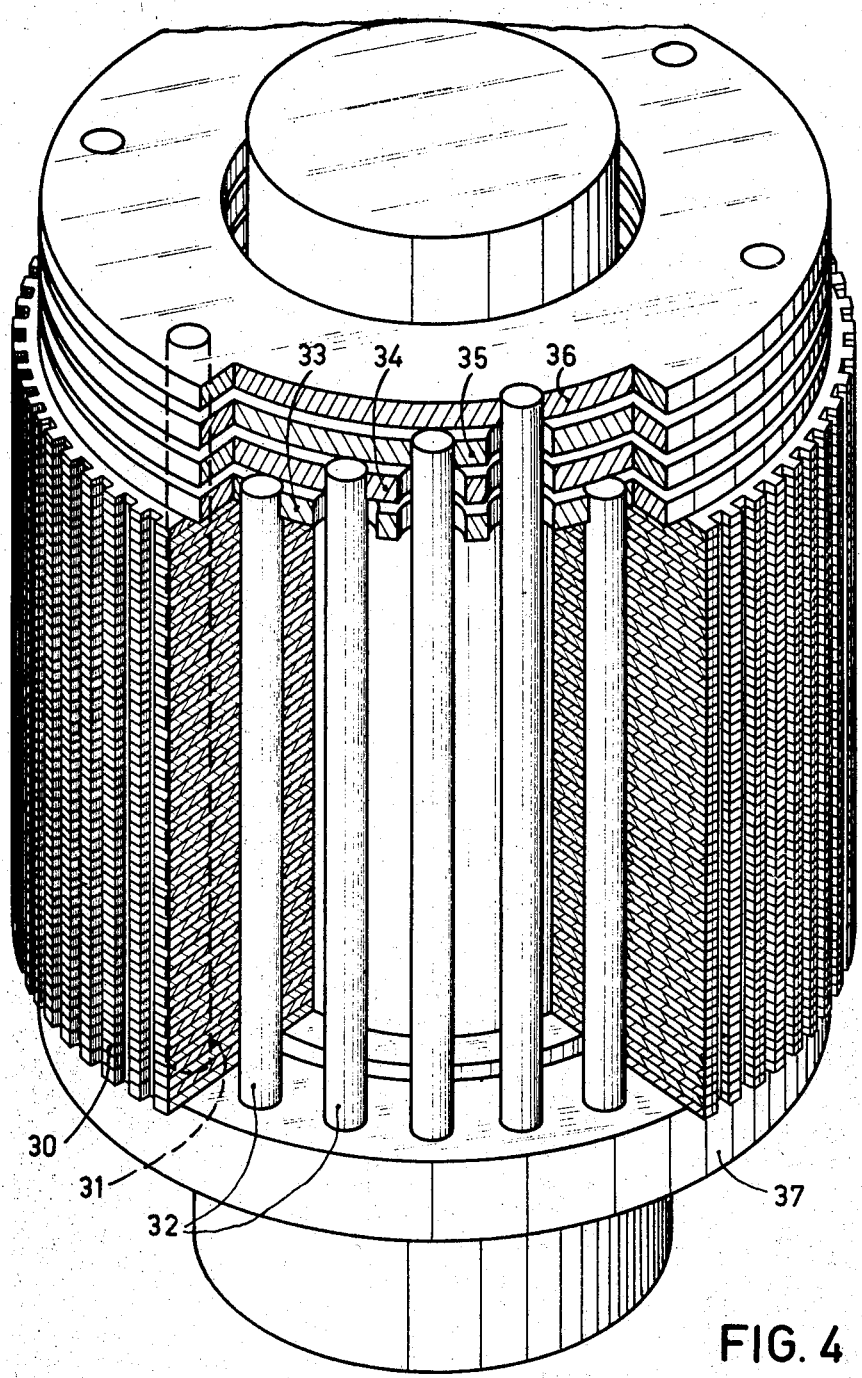
FIGURE 4 shows a rotor with short-circuiting rods.

FIG. 4 illustrates a further embodiment of the motor according to the invention in which the rotor cage comprises a number of axial rods of high electric conductivity which are located in radially spaced circumferential apertures of the rotor. Groups of said rods are short-circuited at either end of the rotor by a separate short-circuiting ring and the rods of each ring are uniformly distributed about the circumference of the ring. The stator is once again arranged about the rotor. By means of this construction is it possible to provide the rotor with short-circuiting rods in the conventional manner, and at the same time the rotor plates can also be easily formed by a punching operation.

The rotor shown in FIGURE 4 is composed of a plurality of annular circumferentially toothed plates 30. The plates 30 are coaxially stacked along the rotor axis. The cage is formed of a number of rods 32 of high electric conductivity which extend in an axial direction and are radially spaced within the holes 31 in the rotor plates 30. The first group of said rods is short circuited at one end by a short-circuiting ring 33. The rods of the other groups extend through enlarged holes in the short-circuit ring 33. The second group of rods 32 is short circuited by the short-circuiting ring 34. Ring 34 has enlarged holes through which the rods of the further groups extend. The remaining groups of rods are short-circuited in a similar manner by the short-circuiting rings 35 and 36.

On the other end of the rotor, the separate short-circuiting rings are made integral with each other so that the rods 32 are connected in an electrically conductive manner to a common short-circuiting ring 37. This materially simplifies the construction of the rotor.

The distance between the rods of each group is chosen so that the torque of fields other than the field of the fundamental wave is for the most part completely suppressed.

Although the invention has been described with reference to certain preferred embodiments thereof, various modifications may be effected by persons skilled in the art without departing from the spirit and scope of the invention, as defined in the appended claims.

What I claim is:

1. A synchronous step motor comprising, a rotor having a plurality of teeth composed of soft magnetic material, a stator having a plurality of spaced stator poles arranged in magnetic coupling relationship with said rotor teeth, each of said stator poles comprising a plurality of teeth arranged so that the angle subtended by two adjacent stator teeth is equal to the angle $\alpha$ subtended by two adjacent rotor teeth, winding means for energizing said stator poles, means coupled to said winding means for selectively energizing said stator poles in a given sequence of pole groups, said stator poles being arranged so that the angle between two adjacent stator poles is given by the expression $(a+b/n)\alpha$ wherein $a$ is a positive integer, $n$ is the number of stator pole groups, and $b$ is the difference between the ordinal numbers of the sequential energizations of the stator poles, and means for producing asynchronous operation of said motor comprising winding means arranged on said rotor, and means for energizing said stator means with out of phase currents whereby the asynchronous speed of said motor is determined by the number of stator poles and the mode of energization thereof.

2. A motor as described in claim 1 wherein said rotor winding means for producing asynchronous operation comprises electrical conductor means arranged in the form of a squirrel cage.

3. A motor as described in claim 2 wherein said rotor comprises a rotatable member composed of non-magnetic material of good electrical conductivity in which said rotor teeth are mounted so as to be uniformly spaced about the circumference of the rotor, a plurality of rings composed of non-magnetic material of good electrical conductivity, each of said rings including a plurality of lugs uniformly distributed about the circumference thereof, said rings being coaxially mounted about the rotor axis so that said lugs engage electrically conductive portions of said rotor lying between two adjacent teeth, said rings being mounted so that they are insulated from one another and so that the lugs of the different rings are staggered relative to one another about the rotor circumference over one or more rotor teeth, whereby the current paths formed in the electrically conductive member are closed by said rings to form said squirrel cage.

4. A motor as described in claim 3 wherein the lugs of a ring are spaced apart over a predetermined distance such that the major portion of the parasitic torques produced by the harmonic components of the magnetic fields are suppressed.

5. A motor as described in claim 1 wherein said rotor comprises a non-magnetic electrically conductive annular member in which said magnetic teeth are uniformly spaced about the circumference, said stator comprising a first annular member coaxially mounted about said rotor and a second member coaxially mounted within said rotor, said first and second stator members each having the same number of stator poles and teeth therein which are arranged about the circumference in spaced confronting relationship, a plurality of non-magnetic electrically conductive rings each of which includes a plurality of lugs uniformly distributed about the circumference thereof, said rings being coaxially mounted about the rotor axis so that said lugs engage electrically conductive portions of said rotor lying between two adjacent teeth thereby forming therewith said rotor winding means, and a plurality of coaxially positioned insulating rings alternately arranged with said conductive rings about the rotor so as to insulate adjacent ones of said conductive rings, said conductive rings being arranged so that the lugs of the different rings are staggered relative to one another about the rotor circumference over one or more rotor teeth.

6. A motor as described in claim 5 wherein said conductive and said insulating rings are of progressively varying diameter and are concentrically arranged about one end surface of said rotor.

7. A motor as described in claim 2 wherein said stator poles arranged in pole pairs so that the magnetic field produced between the poles of a pole pair is axially oriented, said rotor winding means comprising a plurality of axially spaced flat discs insulated from one another and composed of a non-magnetic material of good electrical conductivity, each of said flat discs comprising a circular inner disc and a concentrically arranged outer ring interconnected by means of a plurality of spokes, said inner disc comprising a plurality of radial lugs about its outer circumference and said outer ring comprising a plurality of radial lugs about its inner circumference, said lugs of said inner disc being arranged in spaced opposed relationship with said lugs of said outer ring.

8. A motor as described in claim 7 wherein said stator comprises first and second coaxially arranged members spaced apart in an axial direction, each of said first and second members comprising a plurality of stator poles arranged in spaced confronting relationship, said rotor further comprising a plurality of flat circular insulating discs having radial apertures therein, said insulating discs being interleaved with said electrically conductive discs.

9. A motor as described in claim 8 wherein said rotor is sandwiched between said first and second stator members in an axial direction and wherein said electrically conductive discs are arranged so that the spokes of the various discs are staggered relative to one another about the rotor circumference.

10. A motor as described in claim 8 wherein the apertures in said insulating discs are axially aligned to form, in combination with the openings formed between said radial lugs, a plurality of axial channels radially spaced about the rotor, and wherein said rotor teeth comprise a plurality of laminated magnetic inserts mounted within said axial channels.

11. A synchronous step motor comprising, a rotor having a plurality of teeth composed of soft magnetic material arranged about its circumference, a stator having a plurality of spaced stator poles arranged in magnetic coupling relationship with said rotor teeth, each of said stator poles comprising a plurality of teeth arranged so that the angle subtended by two adjacent stator teeth is equal to the angle $\alpha$ subtended by two adjacent rotor teeth, winding means for energizing said stator poles, means coupled to said winding means for selectively energizing said stator poles in a given sequence of pole groups, and means for producing asynchronous operation of said motor, said asynchronous producing means comprising short-circuited winding means arranged on said rotor and means for energizing said stator winding means with alternating current so that the asynchronous speed of said motor is determined by the number of stator poles and the mode of energization thereof.

12. A motor as described in claim 11 wherein said stator comprises first and second coaxially arranged members spaced apart in an axial direction, each of said first and second members comprising a plurality of stator poles arranged in spaced confronting relationship to produce an axially oriented magnetic field, said rotor comprising a disc of non-magnetic material of good electrical conductivity having a plurality of radial apertures therein about the disc circumference, said rotor teeth being mounted within said apertures, a plurality of rings composed of non-magnetic material of good electrical conductivity, each of said rings including a plurality of radial lugs spaced about the inner circumference thereof, said rings being coaxially mounted along the rotor so that said lugs engage said rotor disc between adjacent pairs of magnetic teeth in progressively staggered relationship about the rotor circumference, the combination of said rings and said rotor disc forming said short-circuited winding means.

13. A motor as described in claim 12 further comprising a plurality of spacer rings of insulating material coaxially mounted on said rotor and interleaved with said rings of good electrical conductivity to provide insulation therebetween.

14. A motor as described in claim 12 wherein the lugs of a ring are spaced apart over a predetermined distance such that the major portion of the parasitic torques produced by the harmonic components of the magnetic field are suppressed.

15. A motor as described in claim 11 wherein said rotor comprises a squirrel cage to form said short-circuited winding means, said rotor comprising a cylindrical member having a plurality of axial channels radically spaced about the rotor, a plurality of rods of good electrical conductivity positioned within said axial channels, a first group of short-circuiting rings coaxially positioned at one end of the rotor and a second group of short-circuiting rings coaxially positioned at the other end of the rotor, the short-circuiting rings of each of said first and second groups making electrical contact in pairs with individual groups of rods uniformly spaced about the circumference of the rotor.

16. A motor as described in claim 15 wherein the second group of short-circuiting rings are formed as an integral ring.

17. A motor as described in claim 15 wherein said cylindrical member comprises a plurality of coaxially arranged discs having aligned apertures therein to form said axial channels and aligned notches about the outer circumference.

18. A motor as described in claim 15 wherein the rods of each said groups are spaced apart a predetermined distance such that the major portion of the parasitic torques produced by the harmonic components of the magnetic field are suppressed.

References Cited

UNITED STATES PATENTS

| | | | |
|---|---|---|---|
| 1,605,796 | 11/1926 | Tanzler | 310—268 X |
| 1,875,763 | 9/1932 | Robinson | 310—112 |
| 2,550,571 | 4/1951 | Litman | 310—268 X |
| 2,428,327 | 9/1947 | Fuge | 310—49 |
| 2,774,922 | 12/1956 | Thomas | 310—49 X |
| 3,204,136 | 8/1965 | Kaiwa et al. | 310—49 |
| 3,225,277 | 12/1965 | Foulger | 310—49 X |

WARREN E. RAY, *Primary Examiner.*

U.S. Cl. X.R.

310—187, 191, 211, 254, 261

UNITED STATES PATENT OFFICE
CERTIFICATE OF CORRECTION

Patent No. 3,426,225                                                               February 4, 1969

Arie Johannes Cornelis Bakhuizen

It is certified that error appears in the above identified patent and that said Letters Patent are hereby corrected as shown below:

Column 1, line 38, after "between" insert -- two --. Column 3, line 17, "another" should read -- pair --; line 67, beginning with "pressed. Owing" cancel all to and including "substantially" in lines 70 and 71, same column 3 and insert -- pressed. Owing to the substantially rectangular shape of the poles 1, 2, 3, 4, etc., the air gap between the teeth 6 and 7 being virtually constant in the rotating field of the stator, odd harmonics are introduced. The direction of the 3rd, 7th, etc., are opposite to the direction of the rotating field of the fundamental wave, the 5th, 9th, etc. As the amplitudes of these harmonics are substantially --. Column 6, line 71, after "poles" insert -- are --. Column 8, line 21, "radically" should read -- radially --.

Signed and sealed this 31st day of March 1970.

(SEAL)
Attest:

Edward M. Fletcher, Jr.                                  WILLIAM E. SCHUYLER, JR.
Attesting Officer                                                 Commissioner of Patents